United States Patent
Eberlberger

(10) Patent No.: US 10,752,307 B2
(45) Date of Patent: Aug. 25, 2020

(54) POSITIONING DEVICE HAVING A TELESCOPING ELEMENT AND A SUPPORTING ELEMENT FOR SEAT POSTS

(71) Applicant: LUPAAN GMBH, Linz (AT)

(72) Inventor: Lukas Eberlberger, Enns (AT)

(73) Assignee: Lupaan GmbH, Linz (AT)

( * ) Notice: Subject to any disclaimer, the term of this patent is extended or adjusted under 35 U.S.C. 154(b) by 292 days.

(21) Appl. No.: 15/746,441

(22) PCT Filed: Jul. 12, 2016

(86) PCT No.: PCT/AT2016/095001
§ 371 (c)(1),
(2) Date: Jun. 5, 2018

(87) PCT Pub. No.: WO2017/011848
PCT Pub. Date: Jan. 26, 2017

(65) Prior Publication Data
US 2018/0273123 A1    Sep. 27, 2018

(30) Foreign Application Priority Data

Jul. 21, 2015  (AT) .................................. A 480/2015

(51) Int. Cl.
*B62J 1/08* (2006.01)
*F16H 25/20* (2006.01)
(Continued)

(52) U.S. Cl.
CPC . *B62J 1/08* (2013.01); *B62J 1/06* (2013.01); *B62K 19/36* (2013.01);
(Continued)

(58) Field of Classification Search
CPC ......... B62J 1/00; B62J 1/02; B62J 1/06; B62J 1/08; B62J 2001/085; B62K 19/30;
(Continued)

(56) References Cited

U.S. PATENT DOCUMENTS 9,580,124 B2 * 2/2017 Shirai .................... B62K 19/36
9,599,137 B2 * 3/2017 Wheeler ............... F16B 7/1409
(Continued)

FOREIGN PATENT DOCUMENTS

CN     202657186 U    1/2013
DE     102010007628 A1  8/2011
(Continued)

*Primary Examiner* — Prasad V Gokhale
(74) *Attorney, Agent, or Firm* — Laurence A. Greenberg; Werner H. Stemer; Ralph E. Locher

(57) ABSTRACT

A positioning device for a telescoping seat post of a bicycle frame includes a tubular telescopic element having a longitudinal axis, a locking device located on an inner surface of the telescopic element, and a tubular supporting element, which is supported in the telescopic element in a rotationally fixed and slidable manner. At least one locking device having at least one locking element is provided and, which can be brought into engagement with the locking device. The locking device has radial grooves, which are arranged in the inner surface of the telescopic element and are bounded in the circumferential direction. The at least one locking element can be actuated by at least one control element. At least one redirecting device redirects a motion of the control element along the longitudinal axis into a motion transverse to the longitudinal axis and transmits the motion to the at least one locking element, which is in contact with the redirecting element, and the at least one locking element can thereby be brought into or out of contact with the locking device in a direction radial to the longitudinal axis.

12 Claims, 7 Drawing Sheets

(51) Int. Cl.
  *F16H 25/24* (2006.01)
  *B62K 19/36* (2006.01)
  *B62J 1/06* (2006.01)
(52) U.S. Cl.
  CPC ..... *F16H 25/2015* (2013.01); *F16H 25/2454* (2013.01); *B62J 2001/085* (2013.01); *F16H 2025/2031* (2013.01); *F16H 2025/2037* (2013.01); *F16H 2025/2062* (2013.01)
(58) Field of Classification Search
  CPC . B62K 19/36; F16B 7/10; F16B 7/105; F16B 7/14; F16B 7/1454; F16B 7/20; F16B 21/16; F16B 37/08
  See application file for complete search history.

(56) References Cited

U.S. PATENT DOCUMENTS

| | | |
|---|---|---|
| 2009/0324327 A1 | 12/2009 | McAndrews et al. |
| 2010/0052286 A1 | 3/2010 | Maier |
| 2011/0185803 A1 | 8/2011 | Demajistre et al. |
| 2011/0204201 A1 | 8/2011 | Kodama et al. |
| 2012/0104810 A1* | 5/2012 | Walsh .................... B62K 19/36 |
| | | 297/215.13 |
| 2012/0228906 A1* | 9/2012 | McAndrews ......... F16B 7/1409 |
| | | 297/215.13 |
| 2014/0112703 A1 | 4/2014 | Chen |
| 2015/0225030 A1* | 8/2015 | Shirai .................... B62K 19/36 |
| | | 403/27 |
| 2017/0225731 A1* | 8/2017 | Hsu ............................ B62J 1/08 |
| 2017/0274949 A1 | 9/2017 | Pittens et al. |

FOREIGN PATENT DOCUMENTS

| | | |
|---|---|---|
| DE | 202013105415 U1 | 1/2014 |
| EP | 2284068 A2 | 2/2011 |
| EP | 2353983 A1 | 8/2011 |
| EP | 2574799 A1 | 4/2013 |
| FR | 2779406 A1 | 12/1999 |
| JP | 200318666 A | 11/2000 |
| JP | 2000318666 A | 11/2000 |
| WO | 2008083843 A1 | 7/2008 |
| WO | 2016029301 A1 | 3/2016 |

* cited by examiner

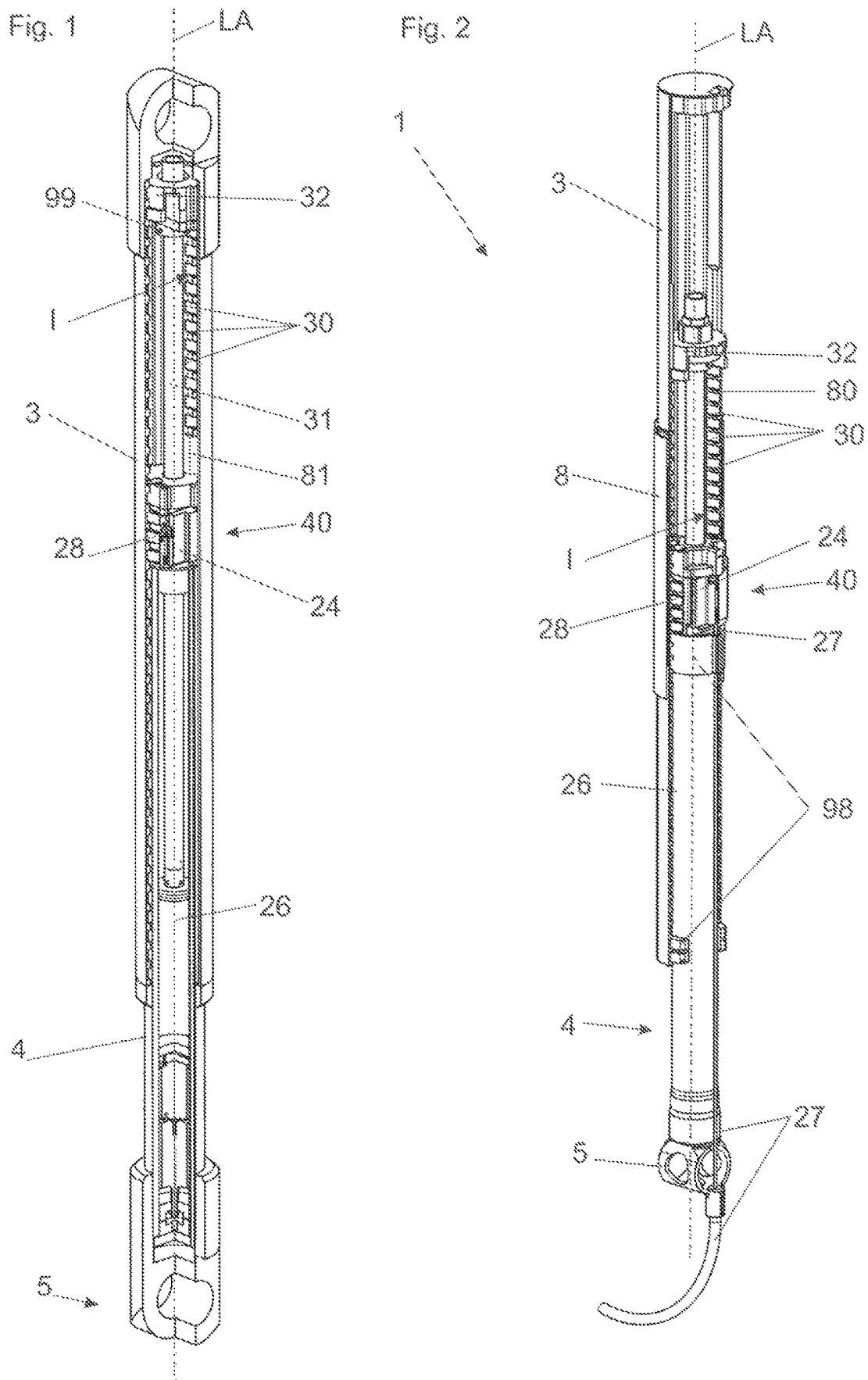

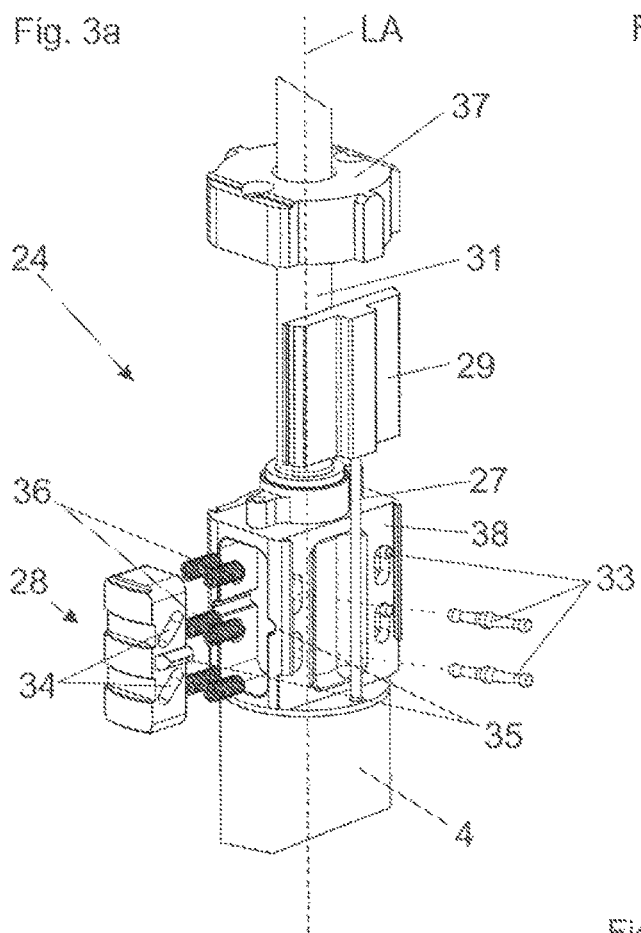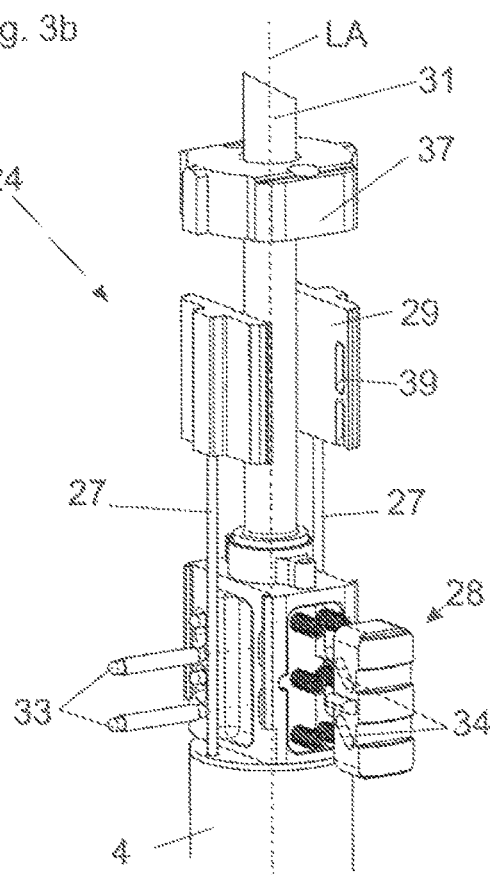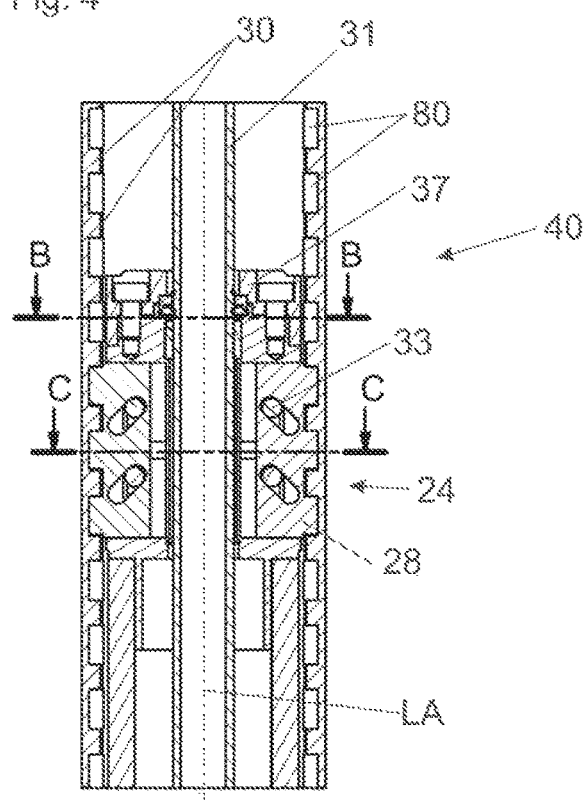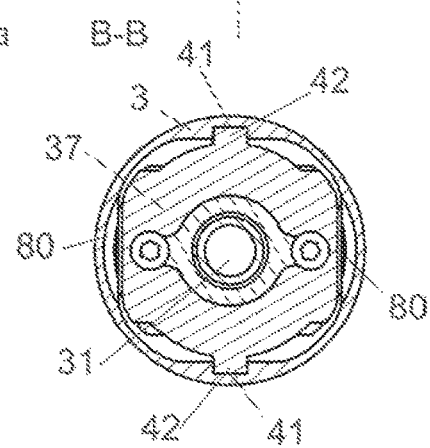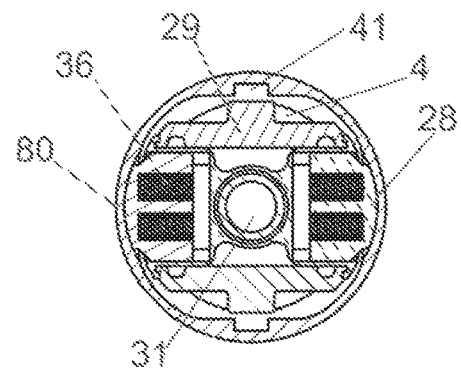

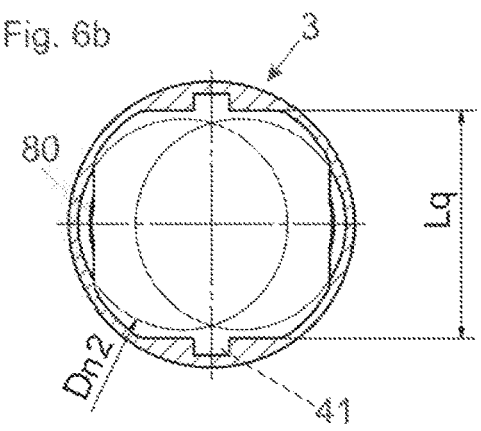
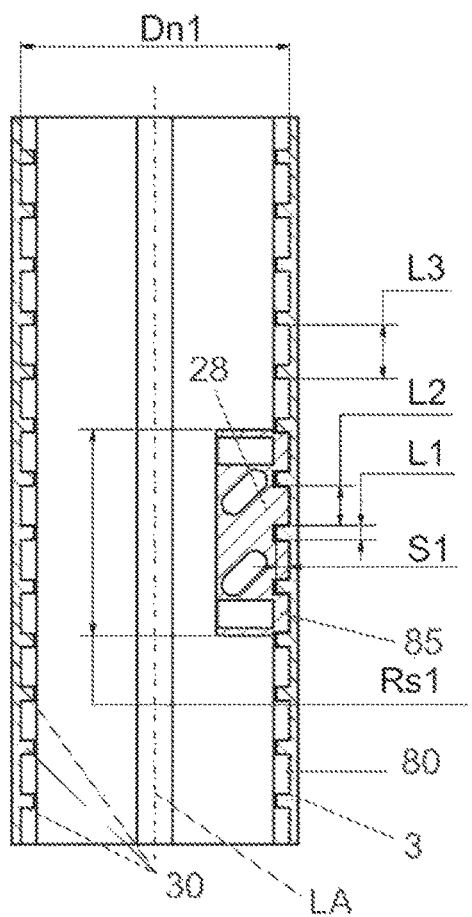
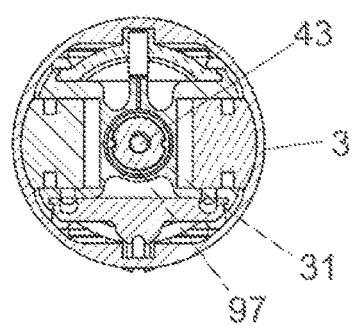
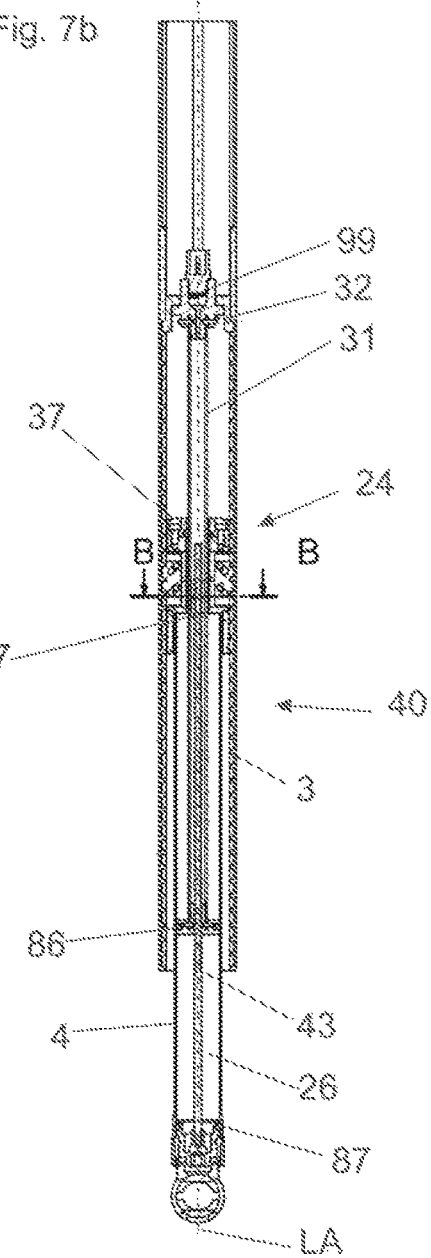

Fig. 8
Fig. 9a
Fig. 9b
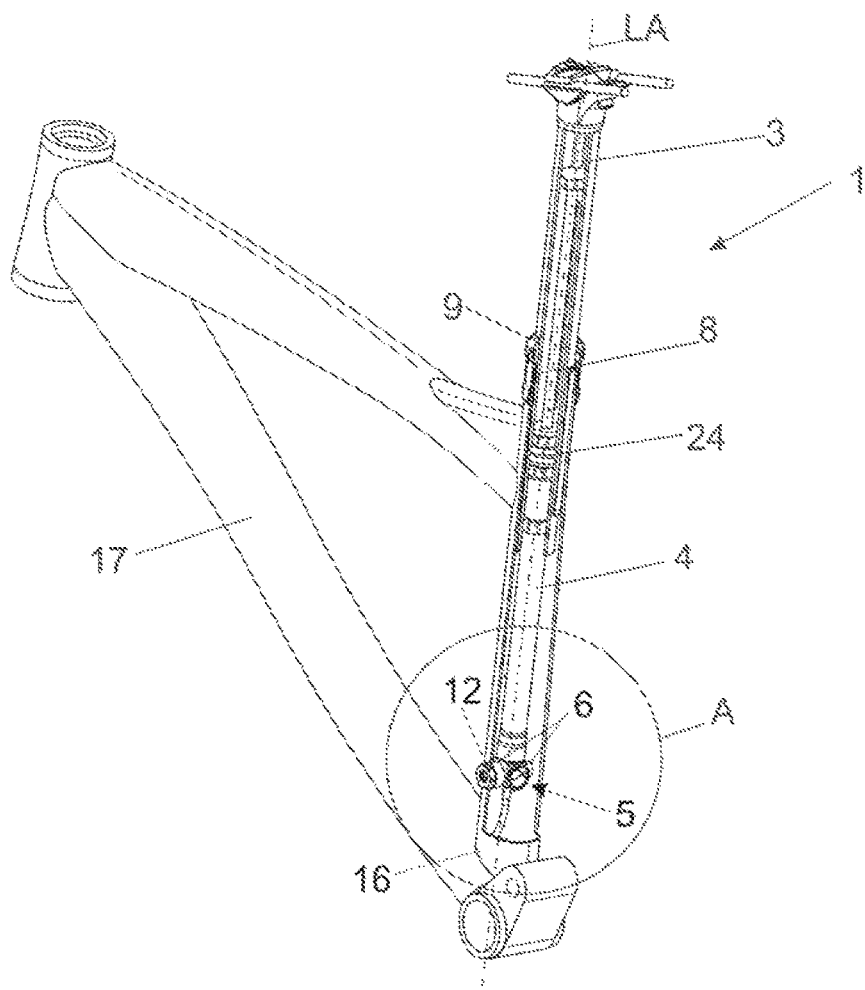
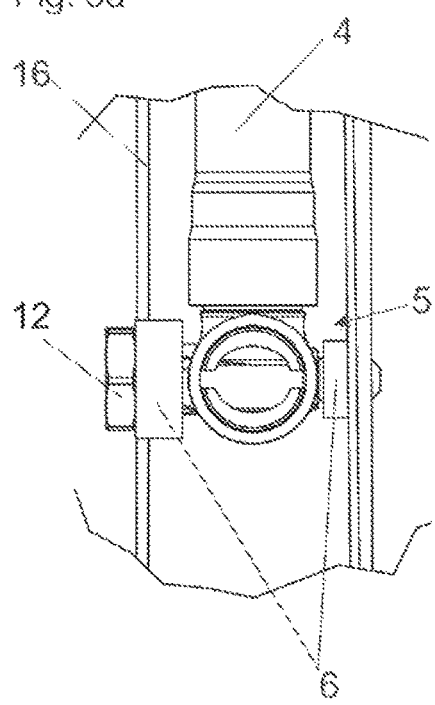
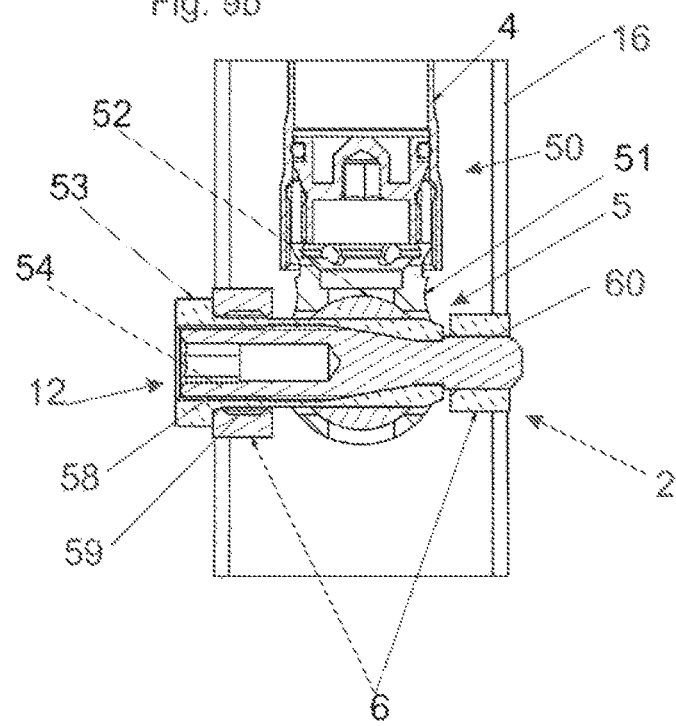

FIG. 14
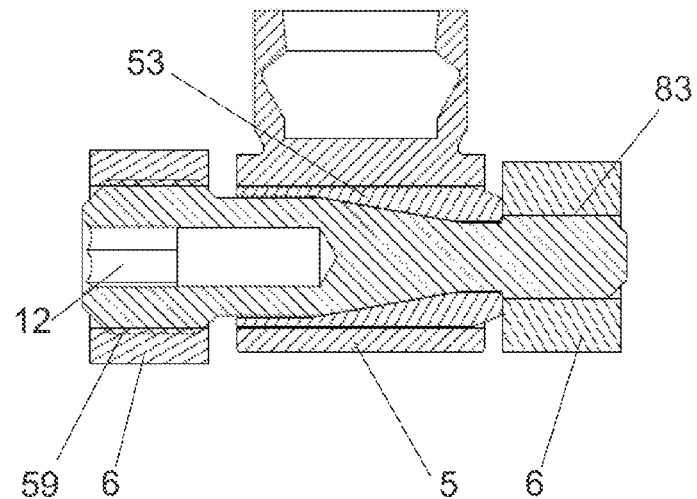
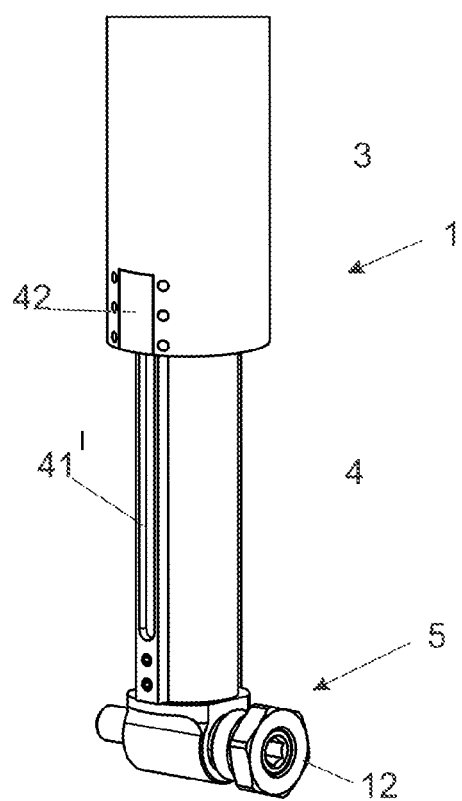
FIG. 15

POSITIONING DEVICE HAVING A TELESCOPING ELEMENT AND A SUPPORTING ELEMENT FOR SEAT POSTS

BACKGROUND OF THE INVENTION

Field of the Invention

The invention relates to a positioning device in particular for a telescopic seat post of a bicycle frame according to the preamble of the first independent claim.

Furthermore, a telescopic seat post for a bicycle frame with a positioning device with the features of the second independent claim is to be provided.

Positioning devices of the type named in the introduction are shown, for example, in US 2009/0324327 and comprise multiple telescopic elements which are pushed into one another and have to be sealed in relation to one another. Said seat post is pushed into the seat tube as a unit and is fixed by way of the saddle clamp. The saddle clamp, in this case, absorbs all the forces and transmits them to the individual walls of the telescoping seat post in a relatively small clamping region. Said region has to be dimensioned strongly enough in order to be able to compensate for the clamping and saddle forces, which is demonstrated in the weight of said component. Furthermore, components such as saddle clamps and also the saddle tube wear in the fastening region when the telescoping seat post is changed multiple times. In addition to this, as shown in the prior art in the case of closed systems, the seals or wipers in the mounting state often face upward. Contaminants such as moisture and dust, which can also pass into the interior of the post when the post is lowered and consequently cause damage to the sensitive components, collect in the gap between the wipers and the movable regions of the posts. A very compact design is necessary as a result of the individual telescoping segments which are pushed into one another or the energy store and locking system situated therein. As a result of said compact design and of the elements nested inside one another several times, only low lifting heights can consequently be achieved on the seat post. The result of telescoping elements which are nested inside one another several times is also that one of the telescoping segments obtains a relatively small tube diameter and is consequently under-dimensioned for the forces that occur. Frequently, it is also not possible to adapt the general overall length of the post system, which is closed per se, and to be able to adjust it to the conditions of the cyclist. A variable telescoping seat post cannot easily be cut down and consequently adapted to the body measurements of the cyclist, such as, for example, inside step length. Furthermore, telescoping seat posts of the disclosed type frequently comprise very pronounced latching means, in which the locking element engages in order to hold the seat post in position. Said latching means weaken the cross section of the seat post, above all when they extend about the entire circumference of the tubular seat post. In order to obtain a smaller cross sectional weakening, a stronger wall must consequently be used in the case of the telescoping segments or they have to be adequately supported by further tubes, which has a negative influence on the weight of the seat post. A further problem in the case of existing systems, in particular in the case of mechanical systems, is the non-braked speed of extension of the movable element. Radial and axial grooves, passes and other mechanisms prevent the possibility of throttling the air flow. This is not very convenient to use, furthermore, it is incompatible with small latching intervals as the probability of incorrect latching increases drastically. The non-defined and user-dependent releasing and locking of the locking mechanism is a further criterion why no latching intervals smaller than 20 mm are achieved, as the locking operation has to take place in a faster and more defined manner with ever decreasing latching intervals and at an increasing speed of extension. The resultant large latching intervals prevent the possibility of fine adjustment of the topmost saddle position as a result of the delimitation of the lift. It is possible that the rider is unable to delimit the saddle far enough, as a result of which he has to convert to a variable seat post with less lift.

Further generic positioning devices are shown, for example, in EP 25 74 799 A1. In the case of said positioning device, the inner telescoping element is rotated relative to the outer telescoping element in order to be able to perform a longitudinal adjustment. The rotating of the outer toothing out of the inner toothing under load is, however, sluggish on account of the high frictional forces occurring in this case on the flanks of the toothing. In addition, a high degree of wear is to be expected on the flanks of the toothing as a result of the friction. In addition, depending on the area of application—as, for example, in the case of a telescoping seat post —, the rotating of the inner telescoping element relative to the outer telescoping element is unwanted as the rotating would produce a change in the angle of further elements which are attached thereto—such as, for example, a bicycle saddle. Said relative rotating, or in other words, the angular offset of the telescoping elements with respect to one another, has to be compensated for in the prior art by an additional device. For example, in the case of a telescoping seat post, an adjustment could not be performed otherwise when the bicycle is being ridden, as the bicycle saddle would not be aligned with the longitudinal axis of the bicycle on account of the rotating of the telescoping elements. The rider would consequently have to dismount for the adjustment or would have to release the saddle at least completely, which would make the operation of the telescoping seat post pointless. An adjustment of the seat post into a lower position is only effected under load as a result of the weight of the rider.

Telescoping seat posts already belong to the prior art and are shown, for example, in EP 2284068 A2. Conventional seat posts are adjustable along the saddle tube by manually releasing a clamping mechanism on the frame. The adjustment of the seat post along the saddle tube is effected, in this case, by releasing the clamping mechanism and then pulling out or pressing in the seat post along the saddle tube. In order to be able to adjust the position of the seat post relative to the saddle tube, the rider consequently must dismount the bicycle. Variable or telescopic seat posts can be controlled by means of a type of remote control either from under the seat or by means of a "remote" switch from the bicycle handlebars. In this case, the clamping mechanism is opened and, on account of an energy source located therein (hydraulic, pneumatic, spring force, . . . ), the seat post is extended and can then be locked in a position by means of the clamping mechanism. The lowering of the seat post is effected by the own weight of the rider. Said rider presses the seat post into the saddle tube by way of his body weight and locks the desired position thereof by means of the "remote" clamping mechanism. Variable seat posts or telescopic seat posts, above all hydraulic telescopic seat posts, are very maintenance-intensive on account of the many components that are movable in relation to one another. Hydraulic posts operate by means of chambers in which a hydraulic medium, such as oil, is situated. If one chamber becomes leaky, this involves the risk of oil loss and the functioning of the automatic adjustment of the telescoping seat post can no longer be assumed. Along with the aspect of environmental pollution caused by escaping oil, the aspect of the weight of the oil or of another hydraulic medium should also be taken into consideration. A container filled with oil increases the weight of the variable seat post and consequently also of the bicycle. The seat post presented as prior art is held in its position relative to the saddle tube by the hydraulic medium that is situated in the chambers. General adjustment and adaptation of the seat post to the rider can only be produced by changing the oil volume in the chambers. One exemplary embodiment also shows an adjustment unit, which is difficult to access, in the saddle tube of the frame for adjusting the stop of the post, the adjustment being effected on the frame from below by means of a union nut. To this end, the bicycle either has to be turned over, tilted or lifted in order to be able to carry out the adjustment from below through the saddle tube using a tool. In this case, there is also the risk of oil escaping out of the chambers when the union nut is removed. Furthermore, in the case of said design, the saddle tube cannot be connected as usual to the base bracket shell as the saddle tube has to remain accessible from below. This is reflected with regard to the torsional rigidity of the frame and the stability of the bicycle.

BRIEF SUMMARY OF THE INVENTION

It is the object of the invention to avoid the afore-described disadvantages and to provide a positioning device, which is improved in relation to the prior art, and an improved telescopic seat post with such a positioning device.

This is achieved in the case of the positioning device according to the invention by the features of the first independent claim, and in the case of the telescopic seat post according to the invention by the features of the second independent claim.

When the latching means comprises radial grooves which are arranged in the inside surface of the telescoping element and are delimited in the circumferential direction, the cross section of the telescoping element is not overly influenced as in the case of a latching means which extends about the complete circumference. Better strength values are achieved as a result of the delimited realization of the radial grooves. As a result, a thinner-walled and lighter material can be utilized for producing the telescoping tube, which has a positive effect on the weight of the positioning unit. In the event of using the positioning device in a seat post, the radial grooves, which are delimited in the circumferential direction, are placed to the left and right of the longitudinal axis of the bicycle such that they lie in the neutral fiber when the seat post is under bending strain and consequently no weakening of the tube structure is generated.

If the locking device is arranged in a fixed manner on the supporting element, there is direct force introduction of the forces which act on the supporting element through the telescoping element.

If the telescopic element comprises at least one guide groove which extends along the longitudinal axis, wherein at least one guide element, which is arranged on the supporting element, engages in the at least one guide groove and is mounted so as to be movable along the guide groove, there is a play-free bearing arrangement between the telescoping element and the supporting element. Depending on the design of the guide elements and guide groove, the torsional forces acting on the positioning device can consequently be better redirected, the forces do not only act on the locking device. Consequently, the locking device does not have to be realized for receiving torsional forces, which implies a simpler and also consequently more reliable and lighter design.

As a result of the at least one latching element being actuatable by at least one actuator, a "remote" control means can be produced. The actuator can be actuated and move the latching element by means of, for example, a Bowden cable or a servo drive. A type of remote control is consequently realized, the latching element does not have to be directly driven. In the event of using the positioning unit in a seat post, the remote control means can be attached, for example, in the form of a lever, switch or rotary handle—to the handlebars of the bicycle. The actuator and consequently the latching element are moved by actuating the "remote" control means. The actuator can be driven in a movable manner mechanically, hydraulically, pneumatically or electrically by a remote control means.

It has proved to be advantageous that the at least one latching element is mounted so as to be movable in a housing, wherein at least one resetting unit, which holds the at least one latching element in a closed position, is arranged between the at least one latching element and the housing, the positioning device remains in a self-locking manner in its position and can only be moved out of its position once the forces that act as a result of the resetting unit have been overcome. Said self-locking effect obtains a securely blocked positioning device, which is not adjusted unintentionally as it strives to remain in its closed position.

When, with the at least one actuator actuated, the at least one latching element is adjustable into an open position in opposition to the resetting unit, the locking device can be displaced and a new position of the positioning device is selectable. As a result of the permanently active resetting unit, the actuator has to be under the application of force in order to hold the latching element in the open position. Once the actuator is no longer actuated, the at least one latching element is moved abruptly outward into the corresponding latching means which is provided for this purpose. The result of said abrupt latching is that the telescoping unit is positioned without delay.

It has proved to be advantageous when a rod extends through the positioning device along the longitudinal axis, wherein the rod is connected to an energy store and wherein a rod locking means, which is movable into engagement with the latching means, is arranged on the rod directly or via a rod adapter. When the rod locking means is movable into engagement with the latching means as a result of a rotation about the longitudinal axis and the position of the rod relative to the telescoping element along the longitudinal axis is blocked, the possibility is created of displacing the rod along the longitudinal axis and of locking it in the latching means via the rod locking means, and the distance between the support tube and the telescoping tube is fixed in its basic setting. The positioning device can be adapted to its area of application. If the positioning device is used, for example, in a seat post for a bicycle, the lower stop point or the minimum saddle height can be adjusted via the rod locking means.

When at least one redirecting means redirects the movement of the actuator along the longitudinal axis into a movement transversely with respect to the longitudinal axis and transmits the movement to the at least one latching element—which is in contact with the redirecting means, this results in a compact system being able to be produced. Redirecting systems outside the telescoping element are consequently not necessary; no devices which could be troublesome during use protrude from the basic form of the positioning device. The redirecting means are situated in the interior of the telescoping tube and do not project out of the positioning device. Dust or contaminants of a different type cannot impair the functioning of the system. The compact design also contributes to the reduction in weight.

When a stop nut is guided in portions on a thread of the stop spindle and the stop nut is guided in a non-rotatable manner in the interior of a rod and when a piston is fixed as a stop at the end of the rod and the stop spindle is fixed on the cylinder bottom, the stop of the positioning device to the energy store can be adjusted, for example, as a result of rotating the rod. Said stop determines the system lift of the positioning device which is exerted by the energy store. The rod comprises a tool receiving means on its accessible end for the rotation about the longitudinal axis.

When the position of the supporting element relative to the telescoping element along the longitudinal axis is determinable by means of the position detecting device, the determined values of the position detecting device can be forwarded to a control and regulating system. Individual positions along the positioning device can consequently be stored and automatically started up. In the case of a seat post of a bicycle, for example in this way the optimum position of the saddle for the terrain in which the cyclist is riding can thus be stored and called up by means of the touch of a button.

According to a further aspect of the invention, it is provided that the supporting element comprises a fastening portion which is connectable to the saddle tube by means of a fastening element which is insertable transversely with respect to the longitudinal axis of the saddle tube. A simple design of the telescopic seat post is realized in this way and, in addition, the effect obtained of the forces that occur on the seat post being introduced into the bicycle frame in an optimum manner.

BRIEF DESCRIPTION OF THE SEVERAL VIEWS OF THE DRAWING

Further details and advantages of the present invention are explained in more detail by way of the description of the figures with reference to the exemplary embodiments shown in the drawings, in which:

FIG. 1 shows a sectional representation of a positioning device,

FIG. 2 shows an application example of the positioning device in a telescopic seat post, FIG. 3a, 3b show exploded drawings of a locking device, FIG. 4 shows a sectional representation of the positioning device, FIG. 5a, 5b show cross sectional drawings of a guide element and a locking device, FIG. 6a, 6b show design details of the latching means and the locking device, FIG. 7a, 7b show a cross sectional drawing and sectional representation of the positioning device with a stop spindle, FIG. 8 shows a sectional representation of a bicycle frame with a seat post inserted in the assembly position, FIG. 9a, 9b show drawings of detail; variously sectioned representations of detail A from FIG. 8, FIG. 14 shows a variant of fastening means, FIG. 15 shows a variant of a guide groove (supporting element to telescoping element) and FIG. 16a, 16b show remote control means and energy sources.

DESCRIPTION OF THE INVENTION

Figure 10:
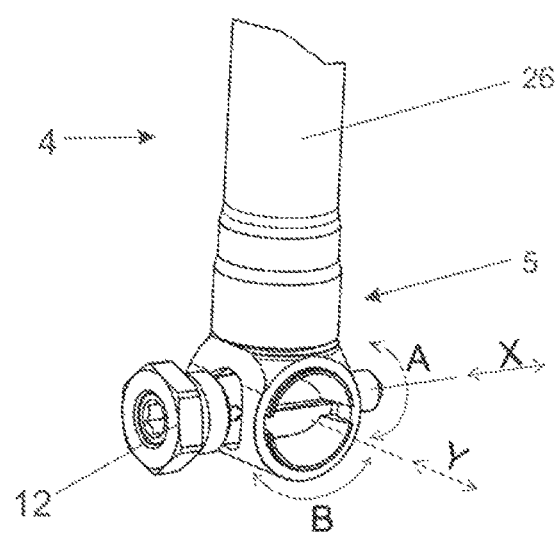
FIG. 10 shows an overload coupling and a compensating device on a supporting element.

FIG. 1 shows a positioning device 40 with a latching means 30, a locking device 24 with at least one latching element 28 which is movably mounted on the locking device 24 so as to be engageable in the latching means 30. The locking device 24 is fixedly connected to the supporting element 4 and the supporting element 4 comprises an energy store 26. The energy store 26 is realized, for example, as a gas pressure spring, the rod 31 thereof in other words: cylinder rod—being in contact with the latching means 30 of the telescoping element 3 by means of the rod adapter and the rod locking means 32. If the telescoping element 3 is moved and the locking device 24 is in an open position (consequently does not engage in the latching means 30), the telescoping element 3 can be moved along its longitudinal axis LA and the supporting element 4. The latching means 30 is situated on the inside surface of the telescoping element 3 and is consequently protected from contaminants. The position of the supporting element 4 relative to the telescoping element 3 along the longitudinal axis LA is determined by means of a position detecting device 81. The locking device 24 is also situated installed in the interior and is mounted so as to be protected from environmental influences. The surface of the supporting element 4 corresponds to the form of the inside surface of the telescoping element 3. This can either be effected directly or by means of sliding elements and/or seals which are situated between the telescoping element 3 and the supporting element 4. Play-free displacement of the telescoping element 3 on the supporting element 4 is consequently ensured.

FIG. 2 shows the application of the positioning device 40 in a telescopic seat post for a bicycle. In this case, the locking device 24 is moved via an actuator 27 either into an open position or into a closed position. The at least one latching element 28 is actuated by means of the actuator 27. If, for example, the actuator 27 is pulled, the at least one latching element is pulled back radially in the direction of the longitudinal axis LA and no longer contacts the latching means 30. Consequently, the locking device 24 has been moved into an open position and the telescoping element 3 can be displaced relative to the supporting element 4 along the longitudinal axis LA. If no force is exerted onto the actuator 27, the at least one latching element 28 returns abruptly into the closed position and moves into contact with the latching means 30. Displacement of the telescoping element 3 along the longitudinal axis LA and along the supporting element 4 is consequently no longer possible. The position of the telescoping element 3 relative to the supporting element 4 can additionally be modified by means of the rod locking means 32. The actual length of the telescopic seat post 1 can be set to the basic setting by means of said adjustment. The lower stop point or the minimum saddle height can be adjusted by means of said mechanism. The maximum saddle position and consequently the system lift can be adjusted by means of a stop ring 98, which is adjustable along the latching means 30, or by means of a lift delimitation for the rod 31 (see FIG. 7b). Persons with a large stride length can consequently adapt the maximum length of the telescopic seat post 1 to their body characteristics as can cyclists with a shorter stride length. The default setting of the telescopic seat post 1 is effected, consequently, by means of the rod locking means 32, the stop ring 98 or a lift limitation of the rod 31 (see FIG. 15*b*), the positioning in portions along the longitudinal axis whilst the bicycle is travelling is effected by means of the locking device 24. The telescopic seat post 1 is connected to the bicycle frame 17 (not shown in said figure) by means of the fastening portion 5.

FIG. 3*a* shows the locking device 24 with at least one latching element 28 which is connected to a housing 38 by means of sensors 35. At least one resetting unit 36, in the form of a spring, an elastomer or also a hydraulic or pneumatic tappet, is situated between the at least one latching element 28 and the housing 38. As a result of the at least one resetting unit 36, the latching element 28 is permanently pressed radially away from the longitudinal axis LA or transversely with respect to the longitudinal axis LA and expanded away from the housing 38. The latching element 28, in this case, engages in the latching means 30 (not shown in this figure). Self-locking locking of the at least one latching element 28 on the latching means 30 is generated as a result of the at least one resetting unit 36. The at least one latching element 28 is moved against the at least one resetting unit 36 by means of redirecting elements 33, which are mounted in the housing 38 so as to be movable. In this case, the redirecting element 33 can be realized as a toggle lever—as shown in FIG. 3*a*: at one end the redirecting element 33 is mounted by way of its head in an articulated and rigid manner relative to the longitudinal axis LA, the middle region of the redirecting element 33 engages in an inclined surface 34 of the latching element 28 and the redirecting element 33 is moved at an end remote from the head. The latching element 28 is moved as a result of the contact between the redirecting element 33 and the inclined surface 43. The movement of the redirecting element 33 is effected by means of the actuating element 29. The actuating element 29 is connected to the housing 38 so as to be movable along the longitudinal axis LA. The redirecting elements 33 engage in said longitudinally-movable actuating element 29 and are moved relative to the inclined surfaces 34 on the latching element 28. The latching element 28 is moved away from the housing 38 or moved closer to the housing 38 as a result of the resetting force of the at least one resetting unit 36 and of the counter-acting force produced by the actuating element 29 and the actuator 27 which is situated thereon.

FIG. 3*b* shows a further exemplary embodiment of the locking unit 24. The redirecting means 33, in this case, are not realized as toggle levers, but are mounted at both their ends in each case by an actuating element 29. The redirecting elements 33 are moved along the longitudinal axis LA and also along the inclined surfaces 34 of the latching element 28 as a result of the two-sided bearing arrangement of the actuating elements 29 and of the connection between the actuating elements 29 and the actuators 27. As is also depicted in FIG. 3*a*, the movement of the redirecting elements 33 results in the latching element 28 being moved in a radial manner away from the housing 38 or being moved closer to said housing and the latching element 28 moving into an open or closed position.

FIG. 4 shows a sectional representation of a positioning unit 40 in detail. The latching means 30 consists of the radial grooves 80 in which the latching elements 28 engage. At least one guide element 37, which connects the telescoping element 3 to the rod 31 in a radially play-free manner, is situated along the rod 31. The rod 31 is a component part of the supporting element 4. Furthermore, the locking device 24 with the latching elements 28 is situated arranged between the rod 31 and telescoping element 3.

The region B-B from FIG. 4 is shown in FIG. 5*a*. Said cross sectional drawing shows how the guide element 37 engages with its guide portion 42 in the guide groove 41 of the telescoping element 3. The guide element 37, in this case, is connected to the rod 31 in a radially play-free manner.

FIG. 5*b* shows the section C-C from FIG. 4. It can be seen, in this case, how the at least one latching element 28 engages in the radial groove 80. This is effected by the resetting unit 36. Should the at least one latching element 28 be pulled out of the radial groove 80, the resetting forces of the resetting unit 36 have to be counteracted. This is effected by actuating the actuator 27 (not shown in this drawing). The guide groove 41 is arranged offset by 90° relative to the center of the at least one radial groove 80.

FIG. 6*a* shows a sectional representation of the positioning device 40. The latching means 30 extends along the telescoping element 3 at a distance between latches L3. The distance between latches L3 is preferably 6 mm. This enables the at least one latching element 28 to be positioned in a 6 mm grid along the longitudinal axis LA of the positioning device 40 and, consequently, a length adjustment in 6 mm steps. Depending on the type of use of the positioning device 40, this value may vary. The maximum inside diameter of the tubular telescoping element 3—subsequently called groove diameter Dn1—is 30 mm. Said value can vary depending on the type of use of the positioning device 40. It is, however, important for the values to be related to one another in a certain way in order to obtain optimum stability and also a latching connection in the case of a compact design. The radial grooves 80 for receiving at least one cam 85 of a latching element 28 are designed as follows: The latching groove width L2 comprises a value of 4.5 mm and the latching flank height S1 a value of 1.5 mm. Corresponding to this, the at least one cam 85 is designed with a small undersize in order to be able to engage in the at least one radial groove 80 in a play-free manner. A latching element 28 comprises at least one cam 85. An embodiment with at least 2 cams 85 is to be preferred, 4 cams are preferably used on one latching element 28. The effective length of the latching element, measured in the assembled state along the longitudinal axis LA, is 23 mm. The groove form diameter Dn2, shown in FIG. 6*b*—a cross sectional drawing of the telescoping tube 3—is calculated from the transverse distance Lq, which is 25.5 mm.

The following calculations show the relationships of the dimensions with respect to one another:

$$Dn2 = Lq \times 0.95$$

$$Dn1/20 = S1$$

$$S1 \times 1 \text{ to } S1 \times 9 = S1$$

$$D1/10 \text{ to } D1/2 = L3$$

$$Dn1/1.3 = Rs1$$

FIG. 7*a* shows a cross section of a stop spindle 43 in a stop nut 97 in a rod 31. As a result of a thread in the interior of the stop nut 97, which corresponds with a thread on the stop spindle 43, and a non-rotatable and linearly sliding bearing arrangement between the rod 31 and stop nut 97, on account of the thread pitch, the position of the stop nut 97 is changed relative to the stop spindle 43 as a result of a rotational movement of the rod 31 about the longitudinal axis LA. A piston 86 of a gas cylinder, which acts as an energy store 26, is situated, for example, on the rod 31, which can be seen in FIG. 7*b*. By changing the rotational position of the rod 31, in this embodiment, the piston rod of the gas cylinder, which simultaneously represents the support member 4, the position of the stop nut 97 is changed relative to the stop spindle 43, wherein the stop spindle 43 is fixedly mounted on the cylinder base 87. As a result of said change, the piston 86, in dependence on the adjustment of the stop nut 97 with respect to the stop spindle 43, moves into contact with the stop nut 97 either earlier or later when the rod 31 is moved, which realizes an adjustable lift limitation of the positioning device 40.

The adjustment of the rod 31 relative to the stop spindle 43 can be effected without tools or by means of a tool. The rod 31 can be reached, for example, through the upper end of the positioning device 40. As a result of releasing the contact between the telescoping element 3 and the guide element 37 and where there is non-rotatable, but linearly sliding contact between rod 31 and telescoping element 3, it is possible to adjust the stop position by rotating the telescoping element 3. This corresponds to an adjustment of the saddle height by rotating the saddle.

The movement of the rod 31 along the longitudinal axis LA is damped; this can be effected, for example, by means of throttle bores or end position damping on the piston 86. It is possible to throttle the speed of extension in only one direction, a check element is additionally placed on the piston for this purpose, as a result of which the saddle extends in a controlled manner, but when being lowered no additional counter force is generated by the body weight.

The rod adapter 99 and the rod locking device 32 are mounted so as to be rotatable with respect to one another about the axis LA. There is a releasable connection along the axis LA, which connection can be realized either in a non-positive locking manner by means of mechanical latches or by means of magnets which are arranged in a circular manner, or in a positive locking manner by means of a removable nut or a removable locking ring. In the case of a non-positive locking connection between rod adapter 99 and rod locking means 32, said connection can be released, with the locking device 24 in the open position (see FIG. 9), by applying a certain minimum force on the telescoping element 3. This corresponds to tool-free disassembly of the telescoping element 3.

FIG. 8 shows a bicycle 17, the saddle tube 16 of which extends upward above the bottom bracket and realizes a hollow body in which the telescopic seat post 1 is situated. The telescopic seat post 1 is connected to the saddle tube 16 at the fastening portion 5 by way of the fastening element 12. At least one connecting portion 6, through which the fastening element 12 projects and then subsequently contacts the fastening portion 5, is situated on or in the saddle tube 16. The telescopic seat post 1 is mounted on the upper end of the saddle tube 16 so as to be displaceable along the longitudinal axis LA on the saddle tube 16 by the sliding element 8. The telescoping element 3, in this case, projects out of the saddle tube 16 and out of the slide element 8 located therein and is mounted so as to be displaceable along the longitudinal axis LA relative to the supporting element 4 or to the saddle tube 16. A wiper 9 on the sliding element 8 prevents the ingress of contaminants into the bicycle frame 17. The receiving means for the bicycle saddle is situated on the upper end of the telescoping element 3. The fastening element 12 is inserted into the fastening portion 5 transversely with respect to the longitudinal axis LA.

FIG. 9*a* shows a sectional drawing of the area of detail A from FIG. 8, the saddle tube 16 being shown in section. The fastening element 12, in this case, projects through the connecting portions 6 situated on the saddle tube 16. Said exemplary embodiment shows how there is one connection portion 6 on one side of the saddle tube 16 and a second connecting portion 6 on the oppositely situated side. The fastening portion 5, in this case, is situated between the two connecting portions 6 and remains in said position. The supporting element 4 is arranged on the fastening portion 5. Consequently, forces which continue downward into the bicycle frame by means of the supporting element 4, are introduced via the fastening portion 5 into the fastening element 12 and consequently via the connecting portions 6 into the saddle tube 16.

FIG. 9*b* shows a sectional representation of the compensating device 2 or of the overload coupling 50. The compensating device 2 consists of multiple individual parts, such as, for example, the fastening element 12 and the fastening portion 5. The fastening element 12 consists of an outer sleeve 53 and an expansion element 54 which is displaceable therein. The outer sleeve 53 is expanded outward as a result of a movement of the expansion element 54 into the outer sleeve 53. The longitudinal adjustment of expansion element 54 relative to the outer sleeve 53 is achieved via the adjusting thread 58, but can also be generated by means of a quick release skewer. The outer sleeve 53 itself also comprises a fastening thread 59 which corresponds with the connecting portion 6. In place of the fastening thread 59, use can also be made here of a different fastening option, such as, for example, a quick release skewer with an eccentric or toggle lever. The fastening portion 5 also comprises rotatable and longitudinally displaceable elements, the shapes of which are blocked by the expansion of the outer sleeve 53. These are explained in more detail in FIG. 11. The overload coupling 50, which is directly connected to the fastening portion 5 in said exemplary embodiment, is realized as a slipping coupling. In the case of a certain overload, the supporting element 4 can consequently be rotated about the longitudinal axis LA. The coupling can be designed as a friction coupling, claw coupling or another type of coupling. A spring element on the coupling could guide the seat post 1 relative to the saddle tube 16, for example for automatic resetting.

FIG. 10 shows the compensating device 2 in the released state. On account of the movable individual parts, rotational movements about the X axis or about the Y axis are possible—this is shown by the arrows A or B. Furthermore, an adjustment along the X or Y axes is possible, which is also shown by arrows. In the released state, the fastening portion 5 can consequently be moved about and along said axes relative to the fastening element 12. If the expansion element 54 is offset inward in the fastening element 12, the movements of the individual movable elements with respect to one another are blocked as a result of the expansion of the outer sleeve 53.

Figure 11:
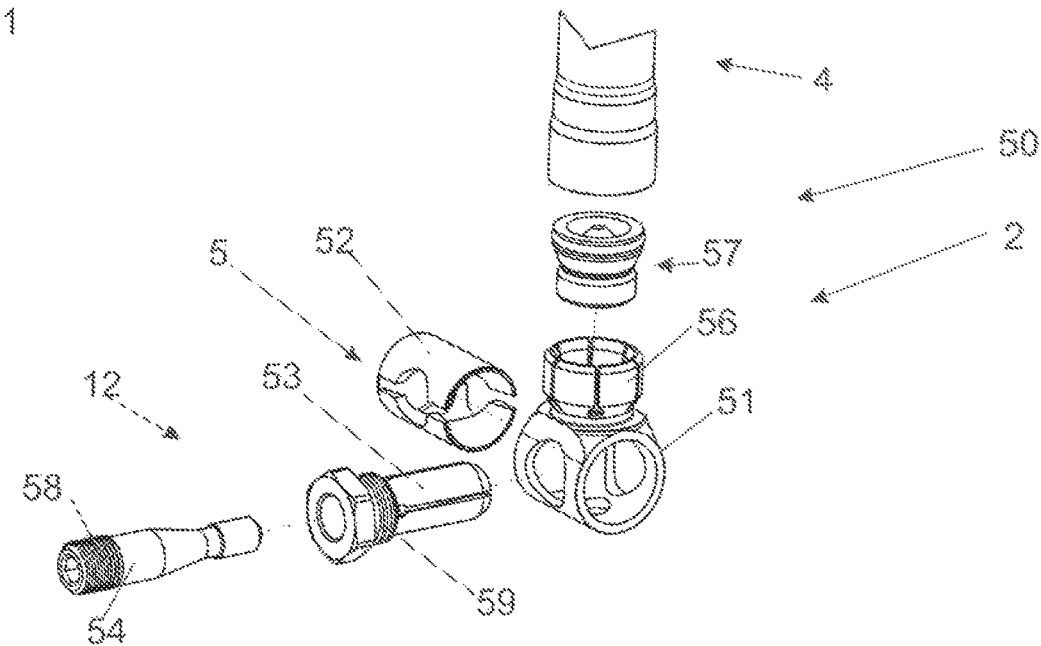
FIG. 11 shows an exploded drawing of the overload coupling and the compensating device.

FIG. 11 shows an exploded representation of the fastening element 12 and of the fastening portion 5 or of the overload coupling 50. The expansion element 54 is rotated into the outer sleeve 53 by means of an adjusting thread 58. In this case, the expansion element 54 is adjusted longitudinally relative to the outer sleeve 53. The longitudinal adjustment can also be carried out by means of a different structural means, such as, for example, a lever on an eccentric (see FIG. 13). The outer sleeve 53, in this case, is expanded in a radial manner. The outer sleeve 53 comprises a fastening thread 59 which then subsequently contacts the frame of the vehicle by means of the connecting portions 6 (not shown in said figure). The fastening can also be effected in a different manner such as, for example, by means of a quick release skewer which is known from the bicycle sector. The outer sleeve 53 engages in an insertion part 52. The insertion part 52 is also radially expandable and, when the outer sleeve 53 is expanded, is also expanded in a radial manner. Said radial expansion is transmitted to the body part 51, the individual component parts no longer being freely movable with respect to one another as a result of the expansion forces which are transmitted from the outer sleeve 53 to the insertion part 52. In this way, with the compensating device in the released state, it is possible to move the outer sleeve 53 relative to the insertion part 52 and, in turn, the arrangement of the outer sleeve 53 and insertion part 52 relative to the body part 51 freely along the axes shown in FIG. 10 and about said axes. Said movements are blocked with expansion by the expansion element 54. The individual expandable component parts return elastically into their original form after release.

Figure 12:
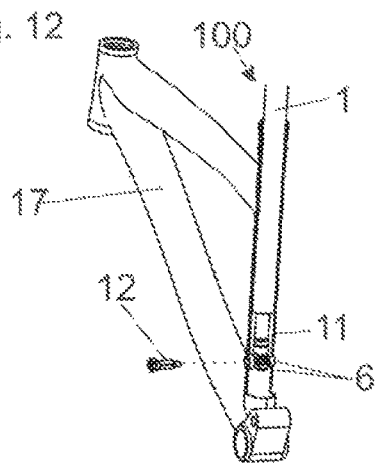
FIG. 12 shows the installation of the seat post and fastening element.

FIG. 12 shows the installation of the seat post 1 into the bicycle frame 17. In this case, the fastening element 12 is removed prior to pushing the telescopic seat post into the saddle tube 16. Once the seat post 1 has been pushed into the saddle tube 16, the fastening means 12 is inserted into the at least one connecting portion 6 and is then fastened.

Figure 13:
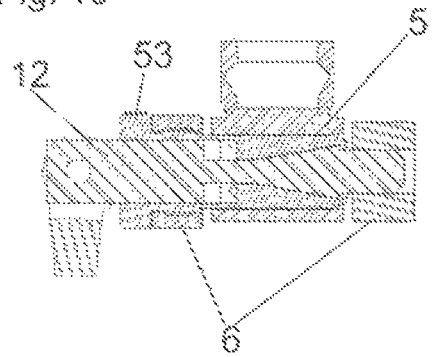
FIG. 13 shows the fastening element with a quick-release skewer.

FIG. 13 shows a variant of the fastening means 12 realized as a quick release skewer with an eccentric. When the quick release skewer is actuated, the outer sleeve 53 is expanded, as the fastening means is pressed away from the at least one connecting portion 6. Said type of connection can also be combined with a compensating device 2, as shown in FIG. 10b.

FIG. 14 shows a further, simplified variant of the fastening means 12. In this case, the outer sleeve 53 is pressed away directly by one of the connecting portions 6 as soon as the fastening means 12 is inserted therein. One of the connecting portions 6, in this case, additionally has a fitting 83 for play-free connection with the fastening means 12. The further connecting portion 6 comprises the fastening region for the fastening means 12—the fastening thread 59 in said exemplary embodiment. Said type of connection can also be combined with a compensating device 2, as shown in FIG. 9b. Just one connection via fastening thread 59 in both connecting portions can also be effected in place of a combination of fit 83 and fastening thread 59. It is also conceivable for the fastening element 12 to be inserted directly into the fastening portion 5 and for no compensating device 2 to be used. In this case, the fastening element 12 can be designed without a cone.

FIG. 15 shows a variant of the anti-twist protection between telescoping element 3 and supporting element 4. A guide groove 41' in the surface of the supporting element 4 extends, in this case, parallel to the longitudinal axis LA of the seat post 1. The guide portion 42, which is fixedly connected to the telescoping element 3, engages in said guide groove. A play-free and sturdy anti-twist protection is consequently designed, the forces acting on the telescoping element 3 are forwarded optimally to the supporting element via the anti-twist protection and are transmitted to the bicycle frame 17 by means of the fastening means 12.

Figure 16A:
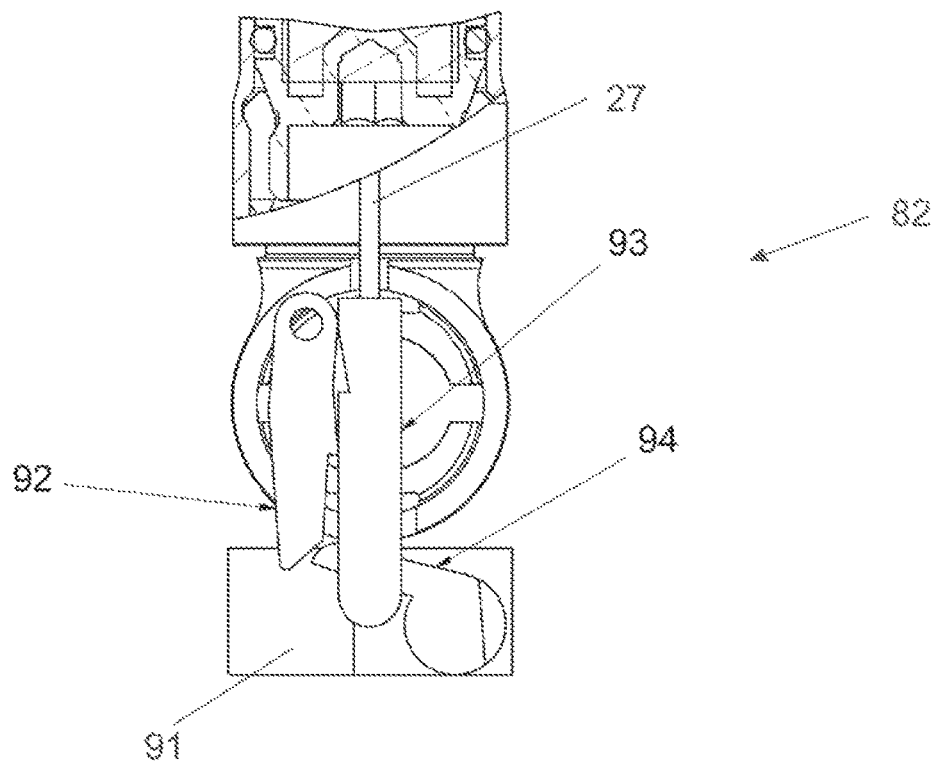
Figure 16B:
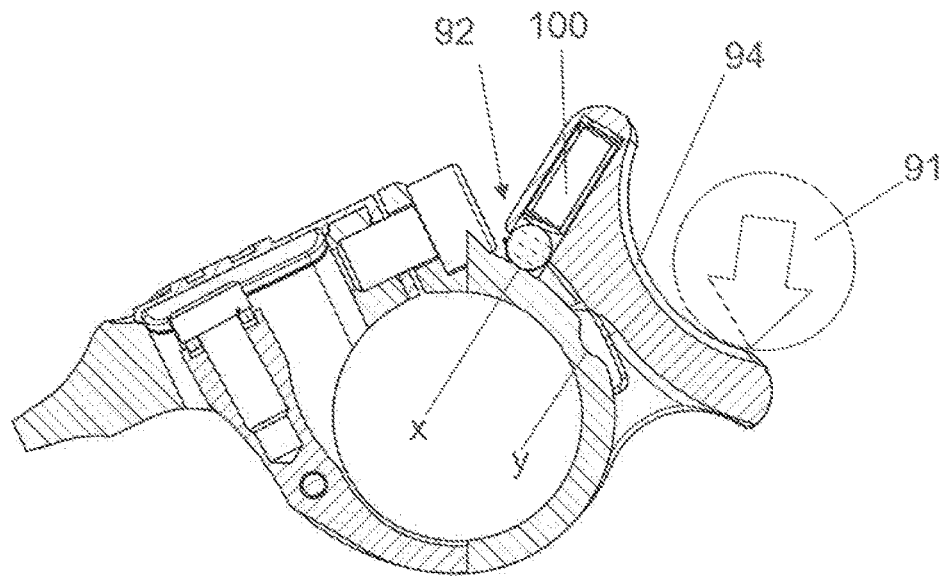

FIGS. 16a and 16b show a remote control means 82 with a device for the abrupt release of the actuator 27. For releasing the locking device 28, a mechanism with a retaining component 92, is preferably realized such that the actuator 27 is held in the release position without further action of the energy source 91, is realized between an energy source 91, for example realized by a thumb of the operator, an electric motor or a cylinder, and the actuator 27. Only when a certain release force of the retaining component 92 is exceeded, or when the retaining component 92 is released, is the actuator 27 released abruptly. The immediate and entire latching of the latching elements 28 in the latching grooves 80 provided is consequently ensured and very small latching distances are achieved with signs of low wear during operation.

A servo motor is used, for example, as the energy source 91 in FIG. 16a. Said servo motor comprises an actuating lever 94 which is operatively connected to the pawl 92. When the servo motor is moved, abrupt displacement of the bolt 93, which is connected to the actuator, is obtained as a result of interaction between the actuating lever 94 and the pawl 92.

FIG. 16b shows a remote control means 82 which is actuated by means of an external energy source 91, such as, for example, by a thumb or a cylinder. Said remote control means acts on the actuating lever 94, which is retained in a closed position x by means of a spring element 100 of a pawl 92. Said retention in a certain position x or y can be effected, for example, by means of a ball seat or latch with corresponding counterpart (ball, plunger). If the force of the energy source 91 exceeds the force of the spring element 100, the actuating lever 94 and consequently also the actuator passes abruptly into an open position y. The latching elements 28 consequently latch abruptly in the latching means 30.

The invention claimed is:
1. A positioning device of a telescopic seat post of a bicycle frame, the positioning device comprising:
a tubular telescoping element having an inside surface, a longitudinal axis and a latching device disposed on said inside surface, said inside surface having radial grooves formed therein functioning as said latching device, said radial grooves being delimited in a circumferential direction;
a tubular supporting element displaceably mounted in said tubular telescoping element so as to be non-rotatable;
at least one actuator;
at least one locking device having at least two latching elements being movable into engagement with said latching device, said at least two latching elements disposed situated radially opposite from one another and are actuatable by means of said at least one actuator;
at least one redirecting device for redirecting a movement of said actuator along the longitudinal axis into a movement transversely with respect to the longitudinal axis and transmitting a movement to said at least two latching elements which are in contact with said redirecting device, and, as a result, said at least two latching elements are movable into contact or out of contact in a displaceable manner with said latching device in a direction radially with respect to the longitudinal axis;
a housing, at least one of said two latching elements is mounted so as to be movable in said housing;
at least one permanently active resetting unit holding said at least one latching element in a closed position, said resetting unit disposed between said at least one latching element and said housing, wherein upon actuation of said at least one actuator, said at least one latching element is adjustable into an open position in opposition to said resetting unit;
an energy source;

a mechanism with a retaining component is disposed between said actuator and said energy source; and said actuator being held in a release position without any further action of said energy source, wherein as a result of exceeding a release force of said retaining component or as a result of releasing said retaining component, said actuator is reset.

2. The positioning device according to claim 1, wherein said energy source is a thumb-controllable lever of a remote control device.

3. The positioning device according to claim 1, wherein said retaining component is a pawl or latch with a corresponding counterpart.

4. The positioning device according to claim 1, wherein said locking device is disposed fixedly on said supporting element.

5. The positioning device according to claim 1,
wherein said telescoping element has at least one guide groove formed therein which extends along the longitudinal axis; and further comprising at least one guide element, disposed on said supporting element, engages in said at least one guide groove and is mounted so as to be movable along said guide groove.

6. The positioning device according to claim 1, further comprising:
a energy store;
a rod extending through the positioning device along the longitudinal axis, said rod is connected to said energy store; and
a rod locking device being movable into engagement with said latching device and is disposed on said rod.

7. The positioning device according to claim 6, wherein said rod locking device is movable into engagement with said latching device as a result of a rotation about the longitudinal axis and blocks a position of said rod relative to said telescoping element along the longitudinal axis.

8. The positioning device according to claim 7, further comprising:
a stop spindle having a thread; and
a stop nut mounted in portions on said thread on said stop spindle and said stop nut is mounted in an interior of said rod, wherein said rod is mounted so as to be non-rotatable about the longitudinal axis relative to said stop nut, wherein a position of said stop nut along the longitudinal axis and relative to said stop spindle is modifiable as a result of a rotational movement of said rod about the longitudinal axis.

9. The positioning device according to claim 1, further comprising a position detecting device, a position of said supporting element relative to said telescoping element along the longitudinal axis is detectable by means of said position detecting device.

10. The positioning device according to claim 1, further comprising a remote controller, said actuator is movable mechanically, hydraulically, pneumatically or electrically by means of said remote controller.

11. The positioning device according to claim 1, wherein said at least two latching elements each have at least two cams for engagement in said radial grooves.

12. The positioning device according to claim 1, wherein:
said tubular telescoping element provided for a bearing arrangement of a saddle, said tubular telescoping element being mounted so as to be displaceable along a longitudinal axis of a saddle tube of the bicycle frame; and
said tubular supporting element mounted in said tubular telescoping element so as to be displaceable, said tubular supporting element has a fastening element and a fastening portion which is connectable to the saddle tube by means of said fastening element which is insertable transversely relative to the longitudinal axis of the saddle tube.

* * * * *